United States Patent [19]

Filhaber

[11] 3,852,850

[45] Dec. 10, 1974

[54] CABLE GRIPPING UNIT

[75] Inventor: Ilmar J. Filhaber, Poughkeepsie, N.Y.

[73] Assignee: Fargo Mfg. Company Inc., Poughkeepsie, N.Y.

[22] Filed: Feb. 26, 1973

[21] Appl. No.: 335,440

Related U.S. Application Data

[63] Continuation-in-part of Ser. No. 150,133, June 4, 1971, abandoned.

[52] U.S. Cl. .......... 24/136 R, 24/81 PE, 24/115 M, 403/369
[51] Int. Cl. ............................................ F16g 11/00
[58] Field of Search .......... 403/369, 366, 371, 372; 24/263 CC, 263 DD, 136 R, 136 B, 81 PE, 115 M; 279/1 Q

[56] References Cited
UNITED STATES PATENTS

| 1,810,403 | 6/1931 | Rupp | 279/1 Q |
| 2,259,460 | 10/1941 | Dexter | 24/263 CC |
| 2,459,900 | 1/1949 | Stoner | 279/1 Q |
| 2,493,556 | 1/1950 | Stone | 24/263 DD |
| 2,872,226 | 2/1959 | Wright et al. | 403/366 |
| 2,966,653 | 12/1960 | Jugle | 24/136 R |
| 3,127,198 | 3/1964 | Orund | 24/263 DD |

Primary Examiner—Roy D. Frazier
Assistant Examiner—Darrell Marquette

[57] ABSTRACT

A self adjusting positively engaging cable gripping unit which automatically adapts itself to a variety of wire diameters of helical stranded cable and which can be provided in the form of connector or dead end.

5 Claims, 11 Drawing Figures

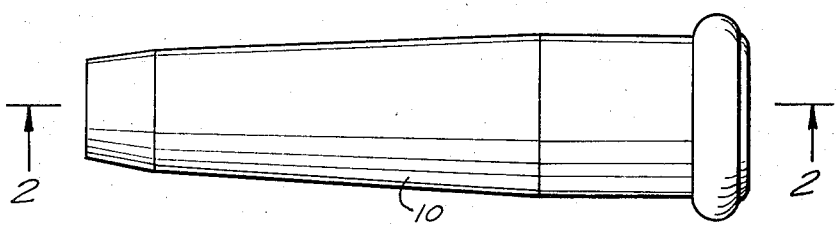
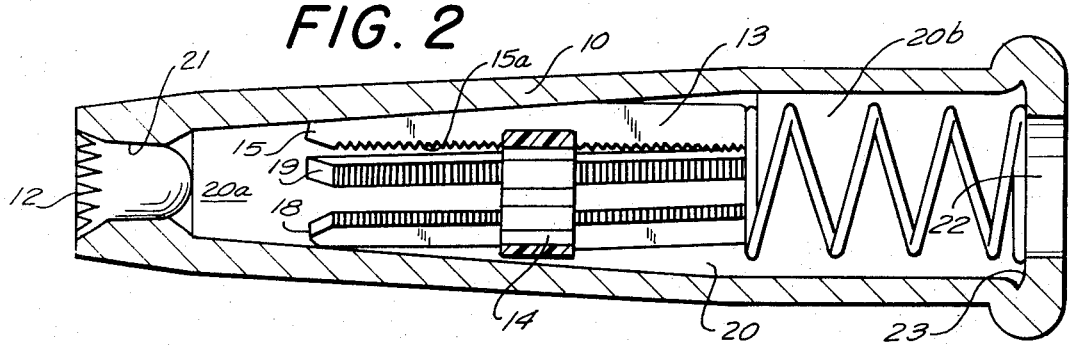
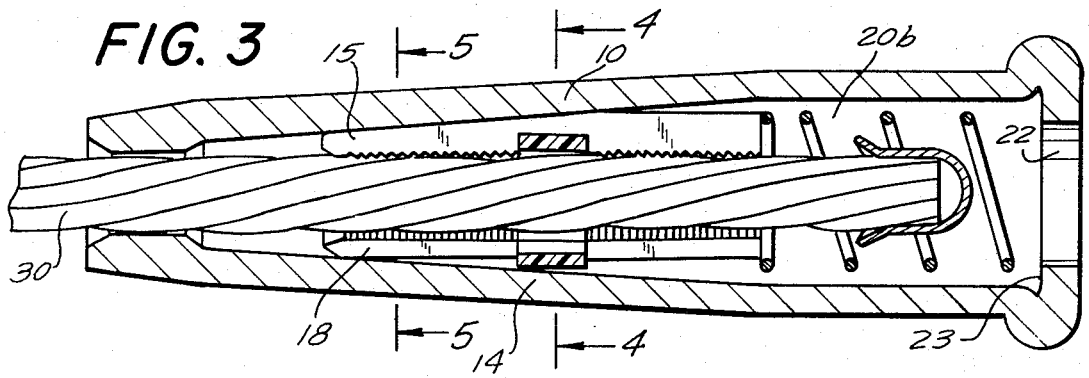
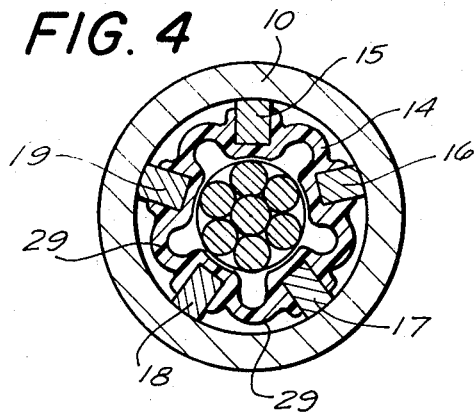
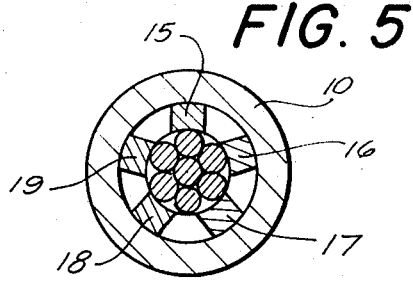

3,852,850

CABLE GRIPPING UNIT

CROSS REFERENCE TO RELATED APPLICATION

This application is a continuation-in-part of United States application Ser. No. 150,133 filed June 4, 1971, now abandoned.

BACKGROUND OF THE INVENTION

In working with cables of a variety of types and particularly helical stranded transmission cables, connectors and dead end devices are used. A connector or line splice as it is sometimes called is used to couple adjacent cables. A dead end device is used to grip one end of a cable in order to anchor the same. These can be referred to generally as gripping units and are considered automatic when the line man need only insert the cable end therein and does not have to make further adjustments such as tightening of screws or bolts.

A variety of automatic gripping units and devices are available. However, for the most part prior to this invention these were not entirely satisfactory from a functional, convenience and economical point of view. From a functional point of view, the device must grip the cable in a positive manner immediately upon insertion and over long periods of time. The grip must be good mechanically and electrically and must insure against failure. From a convenience point of view it is desirable that one size gripping unit be capable of gripping several size cables and do so without adjustment and without the use of special tools. From an economical point of view the unit should be inexpensive to manufacture, must have a minimum of parts and not require precise machining and selection of parts. Of course, the ability to use one size gripping unit for several size cables reduces the costs resulting from inventory and production tooling.

One type of cable in common use today is stranded cable in which the strands are twisted so that each of the strands is in the form of a helix. Helically wound stranded cable of this type is especially difficult to hold firmly in a gripping unit.

SUMMARY OF THE INVENTION

An improved cable gripping unit of the type having a shell with a conical bore terminating at an outer end in a cable accommodating opening and presenting a tapered bore circular in cross section, a gripping member within the bore and movable longitudinally and a helical spring thrusting against the gripping member and the shell, being provided with an improved gripping member comprising an elastic retaining member within the shell bore, a plurality of jaw segments supported by the retaining member within the shell bore in circular arrangement, the retaining member yieldingly urging the jaw segments to ride on the surface of the shell bore and the helical spring yieldingly urging the gripping member toward the reduced end of the shell bore constricting the jaw segments with the jaw segments having portions disposed in opposite hand to the helix of cable strands engaged thereby

DESCRIPTION OF THE DRAWINGS

FIG. 1 is a side view of the cable gripping unit which is the subject of this invention embodied in an automatic dead end;

FIG. 2 is a longitudinal sectional view taken along the line 2—2 in the direction of the arrows in FIG. 1 disclosing the inner parts of the dead end shown in FIG. 1;

FIG. 3 is a view similar to FIG. 2 in which a guy strand is received in the dead end in gripping relationship;

FIG. 4 is an enlarged transverse sectional view taken along the line 4—4 in the direction of the arrows in FIG. 3;

FIG. 5 is a transverse sectional view taken along the line 5—5 in the direction of the arrows in FIG. 3;

PREFERRED EMBODIMENTS

Figure 6:
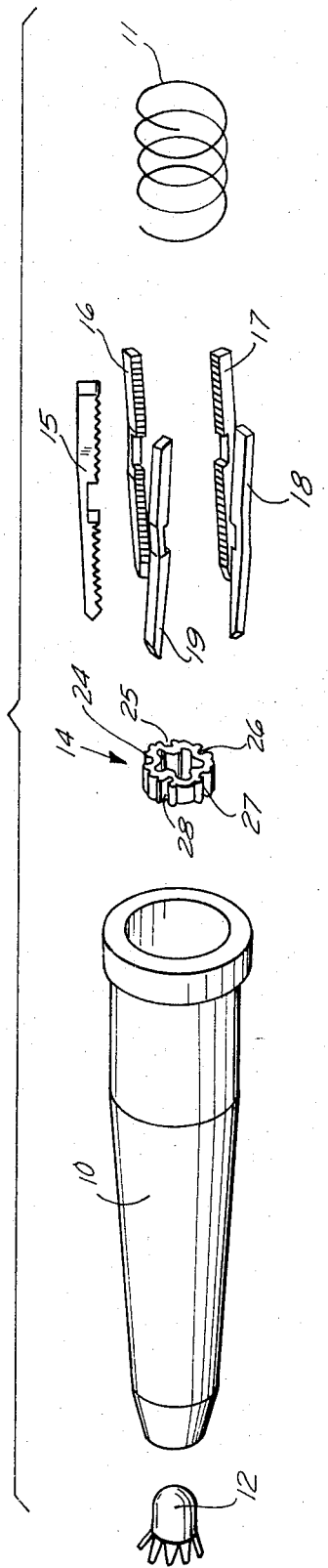
FIG. 6 is an exploded perspective view of the dead end shown in FIG. 1.

A dead end embodying the cable gripping unit which is the subject of this invention is illustrated in FIGS. 1–6 and consists of a casing or shell 10 within which is disposed helical spring 11, cable receiving cup 12, and gripping member 13 comprised of jaw retaining member 14 and jaw segments 15, 16, 17, 18 and 19.

Shell 10 which is formed of metal or other suitable material is provided with a central circular shell bore 20 having a tapered portion 20a terminating in a cable accommodating opening 21 and a cylindrical portion 20b terminating in a reduced diameter opening 22 providing an inwardly projecting annular shoulder 23.

The cable receiving cup is initially disposed as shown in FIG. 1 within opening 21. This cup is provided with outwardly flared finger portions at its edge and is utilized to guide the end of a cable which is inserted through opening 21 as is well known in the art. Helical spring 11 is generally disposed within portion 20b with one end thrusting against gripping member 13 and its remaining end thrusting against shoulder 23 yieldingly urging gripping member 13 toward the reduced end opening 21.

Jaw retaining member 14 is formed of any suitable elastic material and can be molded from Urethane in the preferred embodiment. It is restricted in length and generally circular with a plurality of outwardly facing segment retaining slots indicated in FIG. 6 by the numerals 24, 25, 26, 27 and 28. Adjacent slots are joined by inwardly facing concave bends which are generally designated in the FIGS. by the numeral 29. The jaw segments 15, 16, 17, 18 and 19 are respectively held in slots 24, 25, 26, 27 and 28 with each of the jaw segments being supported between its ends. Each of the jaw segments has a toothed inner surface which extends on either side of the retaining member and an outer wedge surface complementary to the surface of the shell bore on which it rides. In the FIGS. the toothed surface of segment 15 is indicated by the numeral 15a and the wedge surface of segment 15 is indicated by the numeral 15b. This is by way of example.

Each of the jaw segments is provided with first and second cable gripping portions and a mounting portion therebetween. The cable gripping portions of each respective segment are off set from and parallel to each other and disposed or angled in the direction which is in opposite hand to the helix of the direction of the helically wound strands of the cable to be disposed therein. That is, if the wire is right hand helically wound, the jaws precede in a left hand helix so that they lay across the strand. Thus, as seen in the FIGS. and especially FIGS. 8 through 11, jaw segment 19 is provided with first and second cable gripping portions 19a and 19b with the mounting portion 19c therebetween; likewise segment 15 is provided with cable gripping portions 15a and 15b and mounting portion 15c therebetween; segment 16 is provided with cable gripping portions 16a and 16b with mounting portion 16c therebetween; and segment 17 is provided with cable gripping portions 17a and 17b with mounting portion 17c therebetween; and segment 18 is provided with gripping portions 18a and 18b with mounting portion 18c therebetween.

In use the end of a cable such as cable 30 in the FIGS. is inserted in cup 12 and driven relative to shell 10 within the cylindrical jaw bore defined by the jaw segments which are held in position by the retaining member which is concentric with the shell bore. The cable upon moving to the right as seen in FIG. 3 will hold the gripping member 13 to the right against the force developed by helical spring 11 which is tending to move the gripping member to the left. The elastic nature of the retaining member 14 and the configuration thereof will allow the jaw segments to move apart and receive the cable end as the gripping member is moved to the right and to the larger diameter portion of the shell bore. After the cable 30 has passed through the gripping member and the force directing the cable to the right in FIG. 3 is released the helical spring 11 will yieldingly urge the gripping member toward the reduced end of the shell constricting the jaw segments which are yieldingly urged to ride on the surface of the shell bore by the retaining member 14. The constricting of the jaw segments results in a decreased diameter jaw bore and a gripping action of the jaw segments upon the cable 30 which occurs automatically and which will increase with the application of a force to the left in FIG. 3 on cable 30 attempting to withdraw the cable from the gripping unit. The self adjusting nature of the device allows it to adapt itself to several different wire diameters. The jaw teeth on either side of the retaining member 14 provide an improved initial bite and positive engagement. This double row of teeth also serves the function of being an additional safety factor against failure of teeth. Upon failure of one row of teeth the other would take over a greater portion of the load on that particular jaw segment. Improved radial distribution is achieved in the unit by the use of an odd number of jaw segments. It is not possible to have at all times dimensionally correct segments and shells. In such a system as is herein provided deviation in the dimension of components is allowed for since such deviation is negated. The provision of a basic type of jaw segment for a variety of size wires allows for greater economy of inventory and production tooling. Additionally there cannot be any error made in assembly as a result of a use of a wrong segment. The segments can be made through a pressed tooling operation and can be formed of inexpensive grade steel which need perform well only in compression. The small size of jaw allows for storage in a small area.

Figure 7:
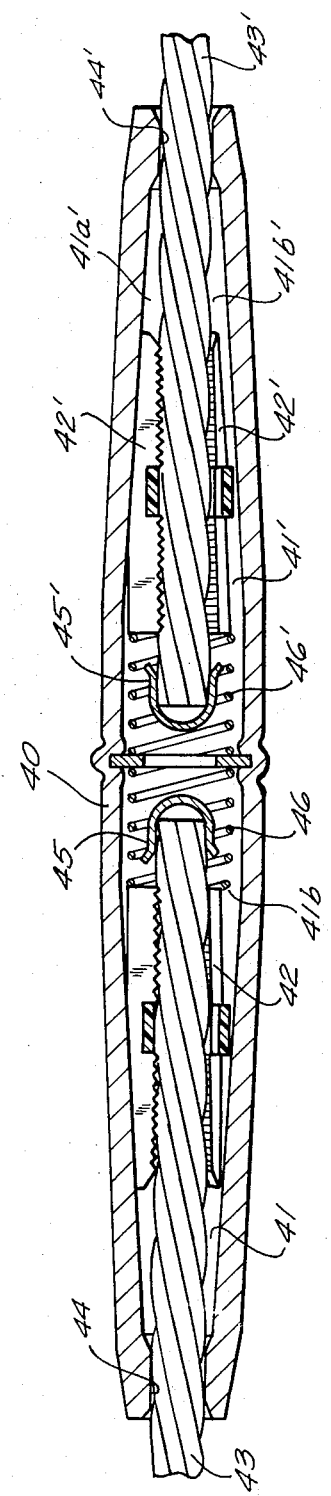
FIG. 7 is a longitudinal sectional view of the cable gripping unit which is the subject of this invention embodied in a line splice or connector with the ends of guy strands received therein.
Figure 8:
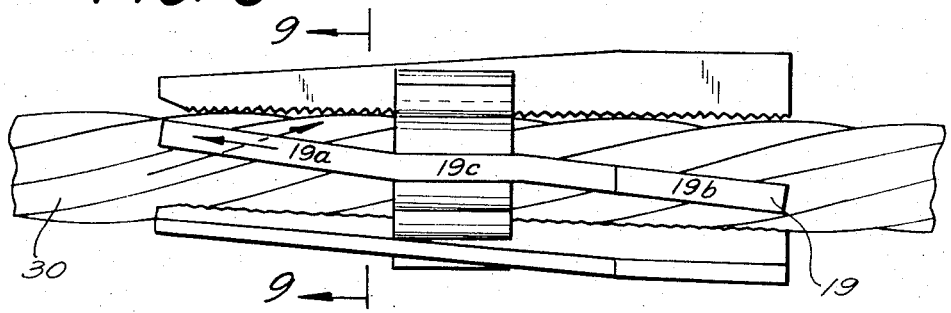
FIg. 8 is an enlarged segmentary view of the retaining member and jaw segments with a helically stranded cable engaged thereby.
Figure 10:
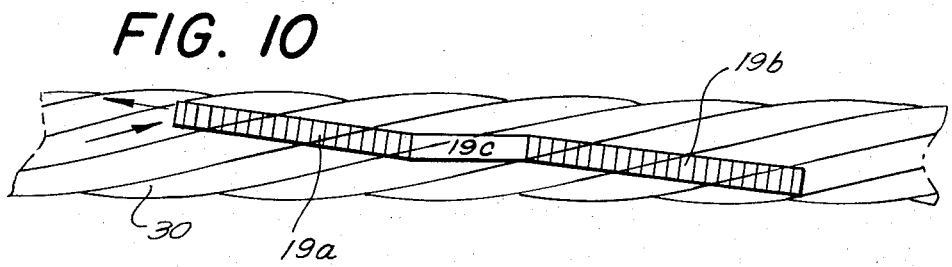
FIG. 10 is a diagrammatic view of a jaw segment and cable illustrating the bite of the segment in the cable.
Figure 11:
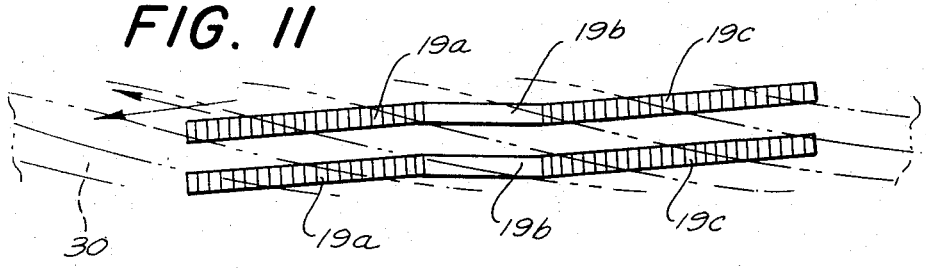
FIG. 11 is a view similar to FIG. 10 but looking from beneath the cable.
Figure 9:
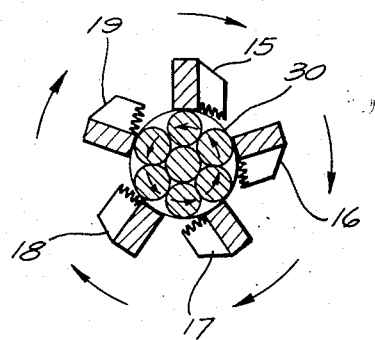
FIG. 9 is a transverse sectional view taken along the line 9—9 in the direction of the arrows in FIG. 8.

In FIG. 7 the invention is shown embodied in a connector which is essentially a double ended dead end. In FIG. 7 a shell 40 is provided which presents two identical shell bores 41 and 41' each having a tapered portion 41a and 41a' respectively and a constant diameter or bore portion 41b and 41b' respectively. Gripping member 42 which is identical with gripping member 13 described in connection with the first embodiment herein is disposed within bore 41 and gripping member 42' which is identical thereto is disposed in bore 41'. The end of cable 43 passing through opening 44 in the shell is received within cup 45 and maintained in the gripping member 42 as helical spring 46 yieldingly urges the gripping member toward opening 44 in a manner identical to that described in connection with the first embodiment herein. Likewise the end of cable 43' passing through opening 44' in the shell is received within cup 45' and maintained in the gripping member 42' as helical spring 46' yieldingly urges the gripping member toward opening 44' in the same manner.

I claim:

1. In a unit for gripping a helical stranded cable of the type including a shell having a conical shell bore terminating at its outer end in a cable accommodating opening and presenting a tapered shell bore circular in cross section, a gripping member within said shell bore and movable longitudinally of said shell, and a helical spring thrusting against said member and said shell, that improvement consisting of said gripping member comprising: an elastic retaining member within said shell bore, a plurality of jaw segments, said retaining member being circular and concentric with said shell bore and provided with a plurality of jaw segment retaining slots within each of which one of said jaw segments is respectively retained whereby said jaw segments are supported by said retaining member within said shell bore in circular arrangement, a cylindrical jaw bore defined by said jaw segments, said retaining member yieldingly urging said jaw segments to ride on the surface of said shell bore, said helical spring yieldingly urging said gripping member toward the reduced end of said shell bore constricting said jaw segments and a cable gripping portion of each of said jaw segments angled in the direction which is in opposite hand to the helix of said cable disposed therein.

2. A unit in accordance with claim 1 in which each of said slots is open at the periphery of said retaining member and facing the surface of said shell bore and said slots are joined by inwardly facing concave bends.

3. A unit in accordance with claim 1 in which each of said jaw segments is provided with first and second cable gripping portions and said retaining member is disposed between said gripping portions.

4. A unit in accordance with claim 3 in which said second cable gripping portion is offset from and parallel to said first cable gripping portion.

5. A unit in accordance with claim 1 in which a cable receiving cup is positioned in the outer end of said shell bore.

* * * * *